United States Patent
Wald et al.

(10) Patent No.: US 8,433,762 B1
(45) Date of Patent: Apr. 30, 2013

(54) GENERATION OF NICKNAME DICTIONARY BASED ON ANALYSIS OF USER COMMUNICATIONS

(75) Inventors: Gideon Wald, San Francisco, CA (US); Wenjie Fu, Mountain View, CA (US); Yanxin Shi, Palo Alto, CA (US); Hong Yan, Mountain View, CA (US)

(73) Assignee: Facebook Inc., Menlo Park, CA (US)

( * ) Notice: Subject to any disclaimer, the term of this patent is extended or adjusted under 35 U.S.C. 154(b) by 55 days.

(21) Appl. No.: 12/623,311

(22) Filed: Nov. 20, 2009

(51) Int. Cl.
 *G06F 15/16* (2006.01)

(52) U.S. Cl.
 USPC .......................... 709/206; 709/202; 709/203

(58) Field of Classification Search .................. 709/206, 709/202, 203
See application file for complete search history.

(56) References Cited

U.S. PATENT DOCUMENTS

| | | | |
|---|---|---|---|
| 2008/0228735 A1* | 9/2008 | Kenedy et al. | 707/3 |
| 2009/0307057 A1* | 12/2009 | Azout et al. | 705/10 |
| 2010/0024042 A1* | 1/2010 | Motahari et al. | 726/26 |
| 2010/0030715 A1* | 2/2010 | Eustice et al. | 706/12 |
| 2010/0114887 A1* | 5/2010 | Conway et al. | 707/737 |
| 2011/0103682 A1* | 5/2011 | Chidlovskii et al. | 382/159 |

* cited by examiner

*Primary Examiner* — Nicholas Taylor
(74) *Attorney, Agent, or Firm* — Baker Botts L.L.P.

(57) ABSTRACT

Methods, apparatuses and systems for generating a nickname dictionary that includes associations between names of users and candidate nicknames based on statistical analysis of user communications observed at a network communications facility, such as a social network system, an email provider and the like.

23 Claims, 3 Drawing Sheets

GENERATION OF NICKNAME DICTIONARY BASED ON ANALYSIS OF USER COMMUNICATIONS

TECHNICAL FIELD

The present disclosure generally relates to data mining and, more particularly, to mining of information in user communications to develop a nickname dictionary.

BACKGROUND

Social networks, or social utilities that enable connections between users (including people, businesses, and other entities) have become prevalent in recent years. In particular, social network systems allow users to communicate information very efficiently. For example, a user may post contact information, background information, job information, hobbies, and/or other user-specific data to a location associated with the user on a social network system. Other users can then review the posted data by browsing user profiles or searching for profiles including specific data. Users may also post messages directly on user profiles and send messages to a private inbox. The social network systems also allow users to associate themselves with other users, thus creating a web of connections among the users of the social network system.

Searching for users of a social network system, or more generally for information regarding an individual or other entity, typically involves composing a search query including forenames and surnames and submitting it to a search system. Often, however, users adopt nicknames as user names, which can be problematic for user searches when a searching user only has forename and surname information. Alternatively, some searchers encounter the opposite problem, failing to find a user by a common nickname because the account is under the full forename. In addition, nicknames that a given individual chooses to adopt may change over time, presenting similar problems even when a searching user remembers a nickname.

SUMMARY

The present invention is directed to methods, apparatuses and systems directed to generating a nickname dictionary that includes associations between names of users and nicknames based on statistical analysis of user communications observed at a network communications facility, such as a social network system, an email provider and the like. In one implementation, a nickname generating process analyzes user communications to develop a nickname dictionary that includes a plurality of entries, each entry identifying a name, a nickname and a confidence score indicating a degree of confidence in the nickname. In this manner, implementations of the invention leverage communications between users to learn nicknames. A variety of functions can leverage the resulting nickname dictionary, such as search engines for locating users or user profiles (such as search query suggestions, search query expansion, result ranking), and registration processes (such as username suggestions and data field seeding).

DESCRIPTION OF EXAMPLE EMBODIMENT(S)

A. Example Operating Environment

A social network system offers its users the ability to communicate and interact with other users of the website. In some implementations, users join the social network system and then add connections to a number of other users to whom they desire to be connected. As used herein, the term "friend" refers to any other user to whom a user has formed a connection, association, or relationship via the website. Connections may be added explicitly by a user—if for example, the user selects another user as a friend—or automatically created by the social network system based on common characteristics of the users (e.g., users who are alumni of the same educational institution). Connections in social network systems are usually in both directions, but need not be, so the terms "user" and "friend" depend on the frame of reference. For example, if Bob and Joe are both users and connected to each other in the website, Bob and Joe, both users, are also each other's friends. The connection between users may be a direct connection; however, some embodiments of a social network system allow the connection to be indirect via one or more levels of connections. Also, the term friend need not require that users actually be friends in real life (which would generally be the case when one of the users is a business or other entity); it simply implies a connection in the social network system. In particular implementations, a user of the social network system may be any suitable entity, such as an individual, a corporation, a partnership, a joint venture, and combinations of the foregoing.

The social network system 20 maintains one or more network communications facilities that provide users with the ability to communicate with other users. Some types of actions include "friend requesting," "wall posting," and "sending a message." Upon acceptance of a friend request, the requestor and requestee become friends. Friends may access more information about each other's profile than other non-friend users. A wall post allows users to post a message to a target user's wall. The wall is a forum for comments or insights about another user or a given topic and typically appears on a user's profile page. Typically, a first user can create a wall post on a target user's wall, to which other users, including the target user, may add messages to form a message thread. The social network system may also maintain some form of private message communications facility, such as intra- and inter-domain electronic mail, that users access by navigating to a private inbox.

Figure 1:
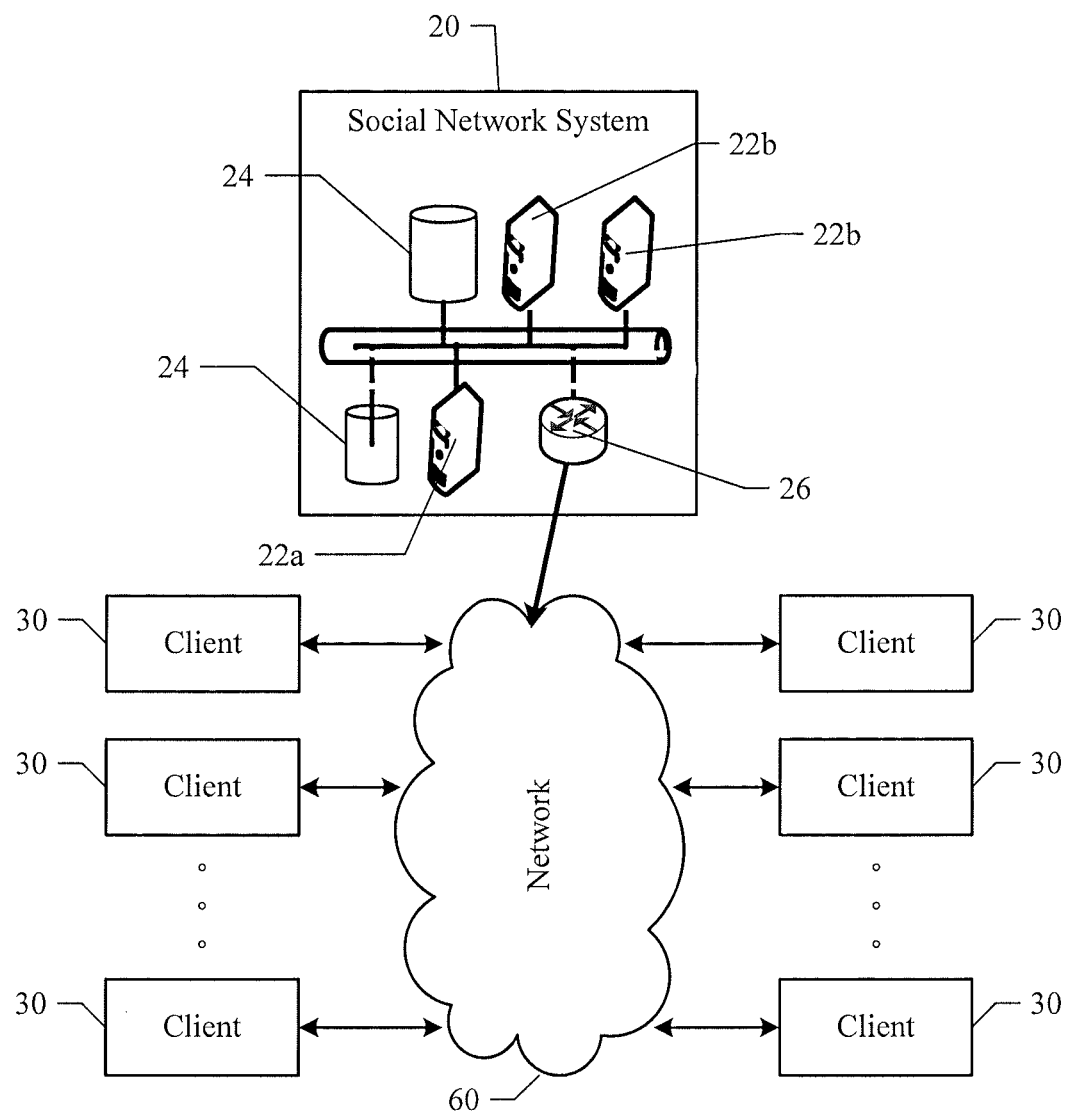
FIG. 1 is a schematic diagram of a computer network environment, in which particular embodiments of the present invention may operate.

Particular implementations of the invention operate in a wide area network environment, such as the Internet, including multiple network addressable systems. FIG. 1 illustrates an example network environment, in which embodiments of the invention may operate. Network cloud 60 generally represents one or more interconnected networks, over which the systems and hosts described herein can communicate. Network cloud 60 may include packet-based wide area networks (such as the Internet), private networks, wireless networks, satellite networks, cellular networks, paging networks, and the like. As FIG. 1 illustrates, a particular implementation of the invention can operate in a network environment comprising social network system 20 and one or more client devices 30. Client devices 30 are operably connected to the network environment via a network service provider, a wireless carrier, or any other suitable means.

The social network system 20 comprises computing systems that allow users to communicate or otherwise interact with each other and access content, such as user profiles, as described herein. Social network system 20 is a network addressable system that, in one implementation, comprises one or more physical servers 22 and data store 24. The one or more physical servers 22 are operably connected to computer network 60 via a router 26. In one implementation, the functionality hosted by the one or more physical servers 22 may include web or HTTP servers, FTP servers, and the like.

Physical servers 22 host functionality directed to the operations of a social network. For example, social network system 20 may host a website that allows one or more users, at one or more client devices 30, to communicate with one another via the website. Content data store 24 stores content and data relating to, and enabling, operation of the social network as digital data objects. A data object, in particular implementations, is an item of digital information typically stored or embodied in a data file, database or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc. Logically, content data store 24 corresponds to a variety of separate and integrated databases, such as relational databases and object-oriented databases, that maintain information as an integrated collection of logically related records or files stored on one or more physical systems. Structurally, content data store 24 connotes a large class of data storage and management systems. In particular implementations, content data store 24 may be implemented by any suitable physical system including components, such as database servers, mass storage media, media library systems, storage area networks, data storage clouds, and the like.

Content data store 24 includes data associated with different social network system 20 users. The social network system 20 maintains a user profile for each user of the website 20. User profiles include data that describe the users of a social network, including proper names (first, middle and last of a person, a tradename or company name of a business entity, etc.) biographic, demographic, and other types of descriptive information, such as work experience, educational history, hobbies or preferences, location, and additional descriptive data. For example, user profiles may include a user's birthday, relationship status, city of residence, and the like. The website 20 further stores data describing one or more relationships between different users. The relationship information may indicate users who have similar or common work experience, group memberships, hobbies, or educational history. A user profile may also include affinity information for another user based on relationships with other users and a user's implicit and explicit interaction with content on the site (reading stories headlines, frequency of accessing content, feedback from other users, profiles, etc). A user profile may also include privacy settings indicating how accessible is to other users is any of the information in the user profile, user contact information or user-defined relationships with other users, such as the user's friends, networks, groups, or the like.

Client device 30 is a computer or computing device including functionality for communicating over a computer network. A client node can be a desktop computer, laptop computer, as well as mobile devices (including cellular telephones, personal digital assistants, and mobile gaming devices). A client device 30 may execute one or more client applications, such as a web browser, to access and view content over a computer network. In particular implementations, the client applications allow users to enter addresses of specific network resources, such as resources hosted by social network system 20, to be retrieved. These addresses can be Uniform Resource Locators, or URLs. In addition, once a page or other resource has been retrieved, the client applications may provide access to other pages or records when the user "clicks" on hyperlinks to other resources. In some implementations, such hyperlinks are located within the web pages and provide an automated way for the user to enter the URL of another page and to retrieve that page. The pages or resources can be data records including as content plain textual information, or more complex digitally encoded multimedia content, such as software programs or other code objects, graphics, images, audio signals, videos, and so forth.

The social network system 20 maintains in content data store 24 a number of objects for the different kinds of items with which a user may interact on the website 100. In one example embodiment, these objects include user profiles, application objects, and message objects (such as for wall posts, invitations, notifications, new feeds, emails and other messages). In one embodiment, an object is stored by the website 20 for each instance of its associated item. These objects and the actions discussed herein are provided for illustration purposes only, and it can be appreciated that an unlimited number of variations and features can be provided on a social network system 20.

B. Nickname Generation

When a user creates a message directed to another user, social network system 20 generates a message object that includes a plurality of attributes. Common to most message channel types (such as wall posts, invitations, notifications, news feeds and electronic mail) are attributes such as identity of the sending user, identity of the target user, a text string embodying the message, the data and time the message was sent, and the like. As discussed below, a nickname generating process, executing periodically, can access content data store 24 to analyze the messages and learn associations between user names (first and/or last names) and nicknames possibly contained in the messages.

This nickname generating process can search for messages between users based on one or more criteria defining a message type. Beyond message channels (e.g., wall posts, notifications, invitations, news feed items, electronic mail, short message service, etc.), messages can be classified into a variety of different message types, each defined by a set of attributes or matching rules. For example, a message type may correspond to "birthday wall posts" defined as wall posts that are directed to a user of social network system 20 on that user's birthday. To locate messages of this type, various database queries can be composed that identify all messages of the wall post channel type that were sent to a target user on the birthday included in the user's profile. In some embodiments, trigger words in the message string itself, such as "happy birthday," "happy B-day," etc. can be used in addition to or in lieu of matching to a target user's birthday. In other implementations, the nickname generating process may search for email messages directed to users that occur on the recipient user's birthday and/or include certain trigger words in addition to or in lieu of wall posts. Other embodiments might search logs of instant messaging communications between users, Short Message Service (SMS) messages, and the like. As one skilled in the art will recognize, other message types can be defined based on a variety of data attributes maintained in content data store 24. For example, other message types that exhibit a high density of name use in the message body can be defined, such as wall posts or emails on a user's wedding anniversary, the first N wall posts when a user initially registers with the website 20, the first N wall posts after a user posts a significant life event (such as the birth of a child, a new job, and the like). Additional filters can also be employed, such as limiting consideration of messages where there have been a threshold number of communications between sending and receiving users to ensure that only messages between users having stronger social connections are considered. Still further, the nickname generating process may also filter messages based on geographic region and/or language version (e.g., German, French, Spanish, etc.) to generate nickname dictionaries tailored to a given region and/or language.

Figure 2:
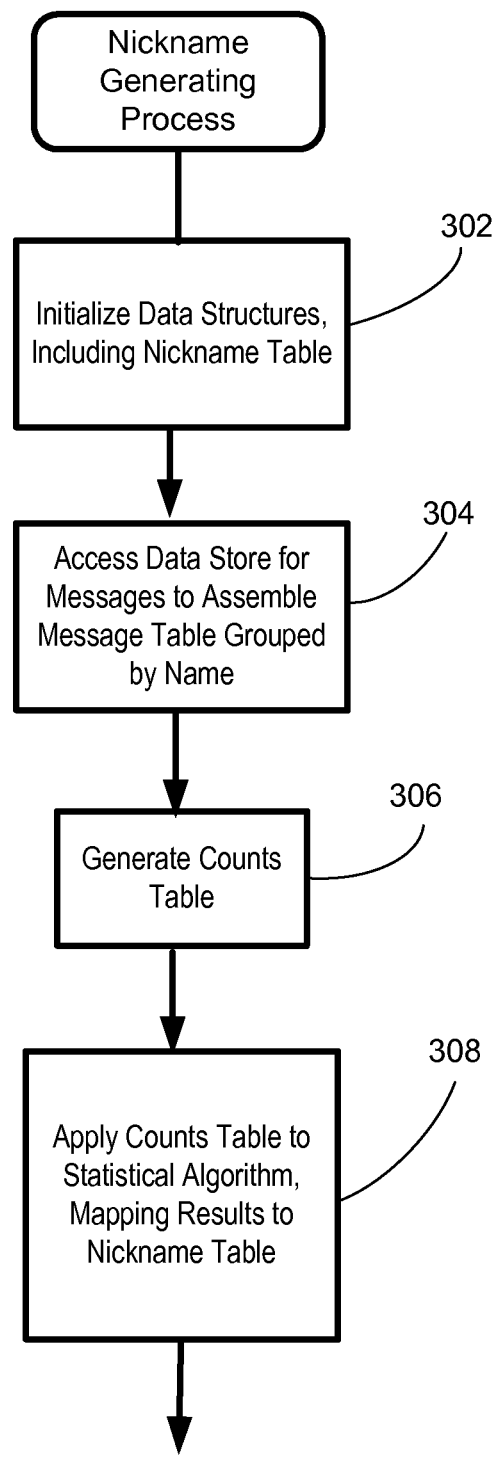
FIG. 2 is a flow chart setting forth an example process according to one implementation of the invention.

FIG. 2 illustrates an example process, according to one possible implementation of the invention, directed to creating a nickname dictionary. As a preliminary step, the nickname generating process initializes temporary and permanent data structures involved in the process, such as a nickname table (302). In one implementation, the nickname table has one or more entries, each entry identifying a name, a nickname and a confidence score. Table 1 illustrates a segment of a nickname dictionary table according to one implementation of the invention, including possible nicknames for the name "Jonathan."

TABLE 1

| Name | Nickname | Confidence Score |
| --- | --- | --- |
| Jonathan | Jon | 0.7 |
| Jonathan | Jack | 0.64 |
| Jonathan | Jonny | 0.8 |
| Jonathan | Jonnie | 0.5 |
| Jonathan | Nathan | 0.49 |

As FIG. 2 illustrates, the nickname generating process accesses content data store 24 to create a message table based on select messages stored therein (304). For example, the nickname generating process can be configured to search for all wall posts within a given time period that are directed to a target user on that user's birthday. The resulting message table, in one implementation, is a data structure that includes the text of all messages that match the selection criteria grouped by the first names and last names of the target users. As optional pre-processing steps, the nickname generating process may normalize the first and last names contained in user profiles, such as removing extraneous capitalizations or punctuations. The nickname generating process may also filter out stop words from the message strings, such as articles ("the", "a", and "an"), profanity, and other words (such as birthday, happy, and the like) known not to be nicknames. However, in some implementations, the consideration of confidence factors, as well as empirical analysis after generating the nickname dictionary, can be used to filter out words that do not have a threshold confidence score relative to a given name.

The nickname generating process then generates one or more statistical attributes for name-word pairs based on analysis of the message table. For example, the nickname generating process, in one implementation, may generate a counts table as described more fully below. For example, for a given name-word pair, the counts table may include: 1) PAIR—the number of occurrences of a given word in a message to users having a given first or last name (for example, PAIR would yield a number of occurrences of the word "dude" in messages to users named "Gideon"); 2) WORD— the global number of occurrences of a given word in the data set; 3) NAME—the global number of total words in messages directed to users of a given first name; and 4) "NAME_BY_WORD"—a count, for a given word under consideration, of the total number of words in communicated messages to users having first or last names, where the word (under consideration) appears in at least one message to at least one user having such a first or last name. NAME_BY_WORD, in one implementation, defines the word space, narrowing it to the name situations where the name-word association could occur. To compute NAME_BY_WORD, the nickname generating process may, for a given word, find every name where there is at least one occurrence of that word in a message, and then obtain a count the total number of words in messages associated with those names. Conceptually, it is the space of words related/connected by names to the word in the name-word pair.

The nickname generating process then applies the counts table to a statistical algorithm to generate confidence scores for the name-word associations and maps the resulting data to the nickname table (308). In a particular implementation, each entry of the counts table, in concept, defines the entries for a 2×2 contingency table for a given name-word pair, including the entries defined by Table 2, below.

TABLE 2

| Contingency Table | | |
| --- | --- | --- |
| Word-Name Pair | Name | Non-Name |
| Word | PAIR | WORD - PAIR |
| Non-Word | NAME - PAIR | NAME_BY_WORD - (PAIR + WORD) |

As Table 2 illustrates and as discussed above, PAIR indicates the number of occurrences of the name-word pair in the message table, while NAME-PAIR is the number of occurrences of all words other than the word under consideration (non-word) in all messages directed to a user having the name under in the word-name pair. WORD-PAIR indicates the global number of occurrences of the candidate word in connection with all other names (non-name), while NAME_BY_WORD−(PAIR+WORD) are the number of occurrences of all other names (non-names) with all other words (non-words) limited to the NAME_BY_WORD space.

The following APACHE HIVE code segment provides an illustrative example of generating the counts table from other preliminary tables or data structures, including fbinv_pair_counts, a table grouped by name of the PAIR variable, and fbinv_name_counts, a table grouped by name of the NAME variable. The APACHE HIVE code segment also demonstrates application of a statistical algorithm to the counts table, such as Fisher's Exact Test.

```
CREATE TABLE IF NOT EXISTS fbinv_nicknames(firstname STRING, word STRING, certainty DOUBLE);
ALTER TABLE fbinv_nicknames SET TBLPROPERTIES ('RETENTION'='30');
INSERT OVERWRITE TABLE fbinv_nicknames
SELECT TRANSFORM(map_output.firstname, map_output.word, map_output.certainty) USING 'python/home/fbinv/fisher_reducer.py'
AS firstname, word, certainty
FROM (
    SELECT TRANSFORM(step_two.firstname, step_two.word, step_two.pair_freq, step_two.name_freq, step_two.f-req, d.freq)
```

```
USING 'python/home/fbinv/fisher_mapper.py'
AS firstname, word, certainty
FROM (
SELECT step_one.firstname, step_one.word, step_one.
    pair_freq, step_one.name_freq, c.freq
FROM (
    SELECT a.firstname AS firstname, a.word AS word,
        a.freq AS pair_freq, b.freq AS name_freq
    FROM fbinv_pair_counts a
    JOIN        fbinv_name_counts       b       ON
        a.firstname=b.firstname) step_one JOIN fbinv_
        name_word_counts c ON step_one.word=c.word)
        step_two
    JOIN fbinv_word_counts d ON step_two.word=d.word
    CLUSTER BY firstname) map_output;
INSERT OVERWRITE LOCAL DIRECTORY '/home/fb-
    inv/fisher_nicks'
SELECT     fbinv_nicknames.firstname,     fbinv_nicknames.
    word, fbinv_nicknames.certainty
FROM fbinv_nicknames;
```

As discussed above, a particular implementation of the invention applies Fisher's Exact Test (or Fisher-Irwin test), which is a statistical significance test that can be used in the analysis of contingency tables. In some implementations, Fisher's exact test can be used to determine the significance of the association between a given name and a give word in the messages table. The resulting P-value from Fisher's Exact Test can be used as a confidence score. In general, a P-value less than or equal to 0.05 is considered sufficient to establish a statistically significant association between a name and a word. In other implementations, alternative tests can be used to test for association confidence, such as Pearson's chi-square test, a G-test or Barnard's test.

In other embodiments, alternative tests can be used in addition to, or in lieu of, statistical tests. In one implementation, another test involves threshold comparisons of different count values. For example, if at least X percent of occurrences of a given word are on the walls with people of a given name (PAIR/WORD), and this word accounts for at least 1 in 10,000 of all words of all the words on the walls of people with that name (PAIR/NAME>1/10000), then nickname generating process considers the name and word to be sufficiently associated such that the word can be considered to be a nickname for the name.

As discussed above, the end result of the nickname generating process is, in one implementation, a nickname dictionary that includes a plurality of entries where each entry identifies a name, a nickname and a confidence score indicating a degree of confidence in the nickname. The process described above can be repeated over time to further refine the nickname dictionary as more data becomes available. In some implementations, the process can be repeated using a sliding analysis window (such as the last year or some other interval) to adjust for possible shifts in nickname usage or other developments over time. A variety of functions can leverage the resulting nickname dictionary, such as search engines for locating entities or user profiles (such as search query suggestions, search query expansion, result ranking), and registration processes (such as username suggestions and data field seeding).

C. Example System Architecture

As described herein, the nickname-generating process can be implemented as a series of computer-readable instructions, embodied on a data storage medium, that when executed are operable to cause one or more processors to implement the operations described above. For smaller datasets, the operations described above can be executed on a single computing platform or node. For larger systems and resulting data sets, parallel computing platforms can be used. For example, the operations discussed above can be implemented using Hive to accomplish ad hoc querying, summarization and data analysis, as well as using as incorporating statistical modules by embedding mapper and reducer scripts, such as PYTHON or PERL scripts that implement a statistical algorithm. For example, Fisher's exact test or other statistical algorithm can be implemented as a PYTHON script, which as shown above can be called using a TRANSFORM clause. Other development platforms that can leverage APACHE HADOOP or other Map-Reduce execution engines can be used as well.

The Apache Software Foundation has developed a collection of programs called HADOOP (named after a toddler's stuffed elephant), which includes: (a) a distributed file system; and (b) an application programming interface (API) and corresponding implementation master server 22a and two slave servers 22b. In some embodiments of the present invention, the distributed computing system comprises a high-availability cluster of commodity servers in which the slave servers are typically called nodes. Though only two nodes are shown in FIG. 1, the number of nodes might well exceed a hundred, or even a thousand, in some embodiments. Ordinarily, nodes in a high-availability cluster are redundant, so that if one node crashes while performing a particular application, the cluster software can restart the application on one or more other nodes.

Multiple nodes also facilitate the parallel processing of large databases. In some embodiments of the present invention, a master server, such as 22a, receives a job from a client and then assigns tasks resulting from that job to slave servers or nodes, such as servers 22b, which do the actual work of executing the assigned tasks upon instruction from the master and which move data between tasks. In some embodiments, the client jobs will invoke HADOOP's MapReduce functionality, as discussed above.

Likewise, in some embodiments of the present invention, a master server, such as server 22a, governs a distributed file system that supports parallel processing of large databases. In particular, the master server 22a manages the file system's namespace and block mapping to nodes, as well as client access to files, which are actually stored on slave servers or nodes, such as servers 22b. In turn, in some embodiments, the slave servers do the actual work of executing read and write requests from clients and perform block creation, deletion, and replication upon instruction from the master server.

While the foregoing processes and mechanisms can be implemented by a wide variety of physical systems and in a wide variety of network and computing environments, the server or computing systems described below provide example computing system architectures for didactic, rather than limiting, purposes.

Figure 3:
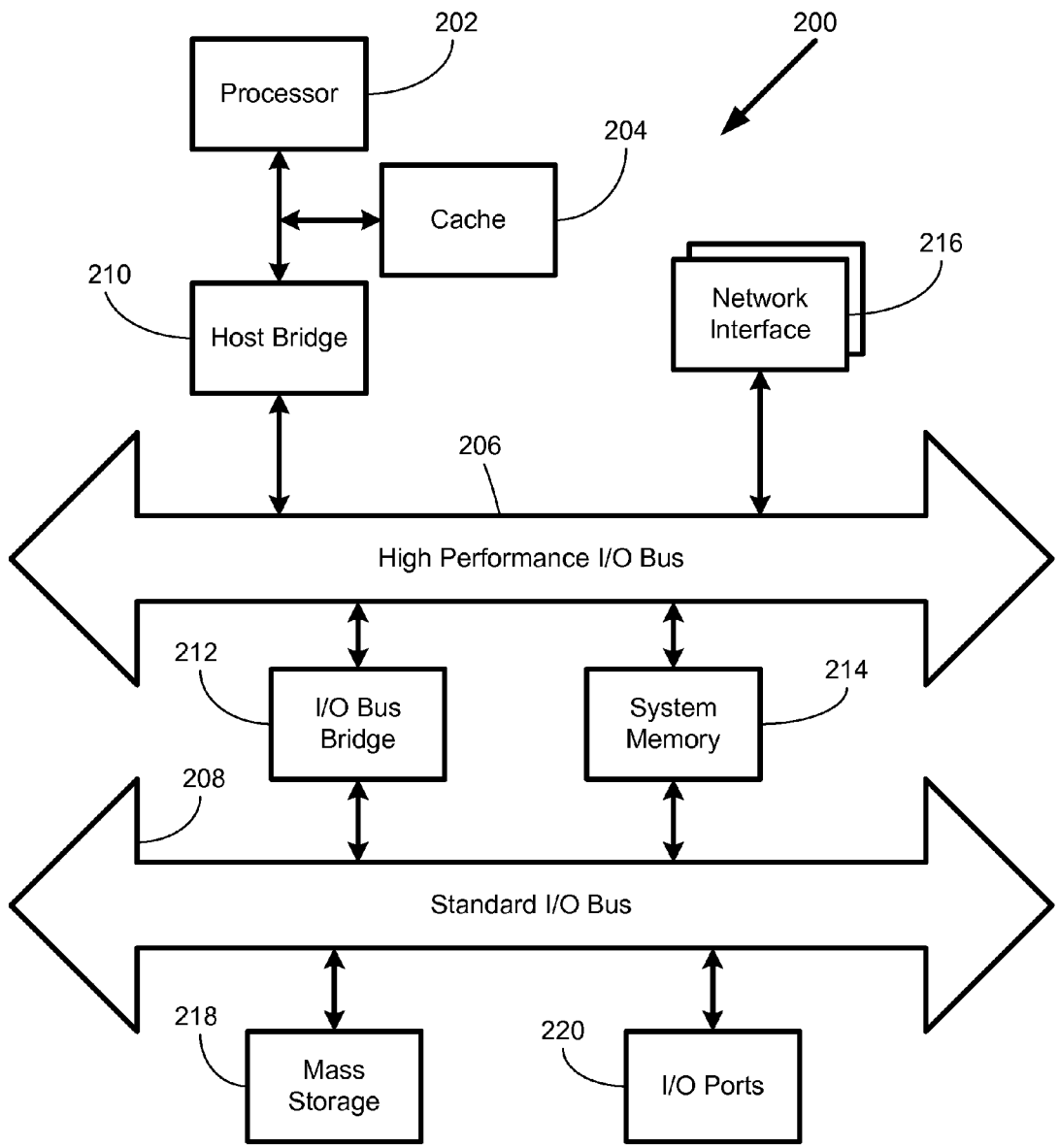
FIG. 3 is a functional block diagram illustrating an example network device hardware system architecture.

FIG. 3 illustrates an example computing system architecture, which may be used to implement a server 22a, 22b. In one embodiment, hardware system 200 comprises a processor 202, a cache memory 204, and one or more executable modules and drivers, stored on a computer readable medium, directed to the functions described herein. Additionally, hardware system 200 includes a high performance input/output (I/O) bus 206 and a standard I/O bus 208. A host bridge 210 couples processor 202 to high performance I/O bus 206, whereas I/O bus bridge 212 couples the two buses 206 and 208 to each other. A system memory 214 and one or more network/communication interfaces 216 couple to bus 206. Hardware system 200 may further include video memory (not shown) and a display device coupled to the video memory. Mass storage 218, and I/O ports 220 couple to bus 208.

Hardware system 200 may optionally include a keyboard and pointing device, and a display device (not shown) coupled to bus 208. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 200 are described in greater detail below. In particular, network interface 216 provides communication between hardware system 200 and any of a wide range of networks, such as an Ethernet (e.g., IEEE 802.3) network, a backplane, etc. Mass storage 218 provides permanent storage for the data and programming instructions to perform the above-described functions implemented in the servers 22a, 22b, whereas system memory 214 (e.g., DRAM) provides temporary storage for the data and programming instructions when executed by processor 202. I/O ports 220 are one or more serial and/or parallel communication ports that provide communication between additional peripheral devices, which may be coupled to hardware system 200.

Hardware system 200 may include a variety of system architectures; and various components of hardware system 200 may be rearranged. For example, cache 204 may be on-chip with processor 202. Alternatively, cache 204 and processor 202 may be packed together as a "processor module," with processor 202 being referred to as the "processor core." Furthermore, certain embodiments of the present invention may not require nor include all of the above components. For example, the peripheral devices shown coupled to standard I/O bus 208 may couple to high performance I/O bus 206. In addition, in some embodiments, only a single bus may exist, with the components of hardware system 200 being coupled to the single bus. Furthermore, hardware system 200 may include additional components, such as additional processors, storage devices, or memories.

In one implementation, the operations of the nickname generating process described herein are implemented as a series of executable modules run by hardware system 200, individually or collectively in a distributed computing environment. In a particular embodiment, a set of software modules and/or drivers implements a network communications protocol stack, parallel computing functions, nickname generating processes, and the like. The foregoing functional modules may be realized by hardware, executable modules stored on a computer readable medium, or a combination of both. For example, the functional modules may comprise a plurality or series of instructions to be executed by a processor in a hardware system, such as processor 202. Initially, the series of instructions may be stored on a storage device, such as mass storage 218. However, the series of instructions can be stored on any suitable storage medium, such as a diskette, CD-ROM, ROM, EEPROM, etc. Furthermore, the series of instructions need not be stored locally, and could be received from a remote storage device, such as a server on a network, via network/communications interface 216. The instructions are copied from the storage device, such as mass storage 218, into memory 214 and then accessed and executed by processor 202.

An operating system manages and controls the operation of hardware system 200, including the input and output of data to and from software applications (not shown). The operating system provides an interface between the software applications being executed on the system and the hardware components of the system. Any suitable operating system may be used, such as the LINUX Operating System, the APPLE MACINTOSH Operating System, available from Apple Inc. of Cupertino, Calif., UNIX operating systems, MICROSOFT WINDOWS operating systems, BSD operating systems, and the like. Of course, other implementations are possible. For example, the nickname generating functions described herein may be implemented in firmware or on an application specific integrated circuit.

Furthermore, the above-described elements and operations can be comprised of instructions that are stored on storage media. The instructions can be retrieved and executed by a processing system. Some examples of instructions are software, program code, and firmware. Some examples of storage media are memory devices, tape, disks, integrated circuits, and servers. The instructions are operational when executed by the processing system to direct the processing system to operate in accord with the invention. The term "processing system" refers to a single processing device or a group of inter-operational processing devices. Some examples of processing devices are integrated circuits and logic circuitry. Those skilled in the art are familiar with instructions, computers, and storage media.

The present invention has been explained with reference to specific embodiments. For example, while embodiments of the present invention have been described as operating in connection with a social network system, the present invention can be used in connection with any communications facility that allows for communication of messages between users, such as an email hosting site. In addition, while some embodiments have been described as analyzing wall posts, other message channel types, such as email, can also be considered in addition to, or in lieu of, wall posts. Still further, the nickname generating process described above can be made accessible to external systems via a set of application programming interfaces. Other embodiments will be evident to those of ordinary skill in the art. It is therefore not intended that the present invention be limited, except as indicated by the appended claims.

What is claimed is:

1. A method comprising:
    accessing, by one or more computing devices, a data store of messages of a select message type to generate data relevant to associations between names associated with target users associated with a social network system and words in the messages, each message being directed to a target user and comprising one or more words, each target user being associated with one or more names;
    performing, by one or more computing devices, statistical analysis of the data to identify associations between at least one name associated with at least one of the target users and one or more words identified in the messages, the statistical analysis being based, at least in part, on:
        a number of occurrences of a candidate word under consideration in messages directed to target users sharing a same name; and
        a number of occurrences of words other than the candidate word in messages directed to target users sharing the same name; and
    constructing, by one or more computing devices, a data structure indicating confidence-of-nickname associations between the at least one name and the one or more words-based at least in part on the statistical analysis.

2. The method of claim 1 wherein the data relevant to associations between names associated with target users and words in the messages comprises statistical attribute data.

3. The method of claim 1 wherein the select message type corresponds to birthdays of the target users of the respective messages.

4. The method of claim 1 wherein the messages are wall posts on profile pages of a social network system.

5. The method of claim 1 wherein the messages are electronic mail messages directed to target users associated with a social network system.

6. The method of claim 1 wherein the accessing the data store comprises constructing a data structure that groups the messages by one of the names associated with the target users.

7. The method of claim 1 wherein the performing statistical analysis of the data comprises applying one or more thresholds to the statistical attribute data.

8. The method of claim 2 wherein the performing statistical analysis of the data comprises applying the data to a statistical analysis module to identify a confidence of the nickname association between the at least one name and the one or more words identified in the messages.

9. The method of claim 8 wherein the statistical analysis module implements Fisher's exact test.

10. The method of claim 1 further comprising consulting the data structure to modify at least one search operation directed to search queries including names.

11. The method of claim 10 wherein the search operation comprises ranking of results including nicknames that are returned in response to queries including names.

12. The method of claim 1 wherein the select message type corresponds to a high density of name use in messages.

13. An apparatus comprising:
one or more processors; and
a memory operably coupled to the processors comprising instructions executable by the processors, the processors being operable when executing the instructions to:
access a data store of messages of a select message type to generate data relevant to associations between names associated with target users associated with a social network system and words in the messages, each message being directed to a target user and comprising one or more words, each target user being associated with one or more names;
perform statistical analysis of the data to identify associations between at least one name associated with at least one of the target users and one or more words identified in the messages, the statistical analysis being based, at least in part, on:
a number of occurrences of a candidate word under consideration in messages directed to target users sharing a same name; and
a number of occurrences of words other than the candidate word in messages directed to target users sharing the same name; and
construct a data structure indicating confidence-of-nickname associations between the at least one name and the one or more words-based at least in part on the statistical analysis.

14. The apparatus of claim 13 wherein the data relevant to associations between names associated with target users and words in the messages comprises statistical attribute data.

15. The apparatus of claim 13 wherein the select message type corresponds to birthdays of the target users of the respective messages.

16. The apparatus of claim 13 wherein the one or more code modules further comprise computer-readable instructions operative to cause the one or more processors to construct a data structure that groups the messages one of the names associated with the target users.

17. A method comprising:
accessing a data store of messages;
generating statistical counts relevant to name-word associations, wherein each message is directed to a target user and includes one or more words, wherein each target user is associated with one or more names, and wherein the statistical counts, for a given name-candidate word pair, comprise:
a first count of the association occurrences between the name and the candidate word,
a second count of the association occurrences between the name and all words other than candidate word,
a third count of the association occurrences between the candidate name and all other words than the candidate word, and
a fourth count of the number of occurrences of words other than the candidate word that have at least one association occurrence with a name, including the candidate name, that has at least one association occurrence with the candidate word;
applying, for one or more pairs of a candidate name and a candidate word, a statistical algorithm to the statistical counts to determine a confidence-of-nickname association between the candidate name and candidate word; and
constructing a data structure indicating the confidence-of-nickname association between the candidate name and the candidate word.

18. The method of claim 17 wherein the statistical algorithm is Fisher's exact test.

19. The method of claim 17 wherein the messages are filtered against a select message type during the accessing step.

20. The method of claim 19 wherein the select message type is defined relative to a plurality of attributes including a message channel type and a temporal attribute.

21. The method of claim 20 wherein the temporal attribute is a time range.

22. The method of claim 20 wherein the temporal attribute is defined relative to birthdays of target users.

23. The method of claim 17 wherein the accessing the data store comprises generating a message table including the one or more words of one or more messages in the data store grouped by target user name.

* * * * *